Aug. 26, 1969  L. D. GRAMES  3,463,222

DOUBLE DIMPLED SURFACE FOR HEAT EXCHANGE PLATE

Filed Aug. 16, 1967

INVENTOR.
Lloyd D. Grames
BY
Wayne H. Lang
AGENT

United States Patent Office 3,463,222
Patented Aug. 26, 1969

3,463,222
DOUBLE DIMPLED SURFACE FOR HEAT EXCHANGE PLATE
Lloyd Donald Grames, Wellsville, N.Y., assignor to The Air Preheater Company, Inc., Wellsville, N.Y., a corporation of Delaware
Filed Aug. 16, 1967, Ser. No. 661,091
Int. Cl. F28d *19/00, 17/00;* F28f *3/00*
U.S. Cl. 165—10                                    3 Claims

ABSTRACT OF THE DISCLOSURE

A heat absorbent plate for use in a gas to gas heat exchanger wherein heat from one gaseous media is absorbed by a plate as an intermediate step before being transferred to another media. Each plate has formed thereon spacers in the shape of dimples. The dimples extend outward from opposite faces of each plate with a wall of a dimple which extends outward from one face of a plate being an unbroken extension of the dimple formed on the opposite side of said plate.

---

The present invention relates generally to a form of metallic plate over which gaseous fluids are directed to absorb heat therefrom to transfer the heat thus absorbed to a fluid which alternately contacts the plate.

A regenerative heat transfer apparatus of the type herein defined usually comprises a cylindrical rotor divided into compartments in which are positioned a mass of heat absorbent elements in the form of spaced metallic plates. Such heat absorbent plates are first exposed to the flow of heating gases to absorb heat therefrom and then, as the rotor turns about its axis, the plates are exposed to the fluid to be heated to impart the absorbed heat thereto. An apparatus of this kind is operated under conditions that promote condensation of moisture in the gases or formation of products of combustion that adhere to the heat absorbent element. Deposits of such products of combustion on the element soon choke off the flow of fluid through passageways of the heat absorbent element to thus impair the efficiency of the apparatus.

Various forms of heat absorbent plates having corrugated, notched, bent or otherwise variously formed surfaces have been used in this capacity. It has been found however that one of the best arrangements for heat exchange surface of this general type comprises simply a series of substantially plane sheets spaced apart to provide flow passageways therethrough for the flow of fluid in contact with the several sheets.

Many types of spacers between the sheets have been used including elongate wires secured to the sheets, elongate "notches" or even protuberances such as "dimples" on the surface of the several sheets. However the usual elongate "notches" or "spacers" limit the flow of fluid to channels and the sharp corners tend to form pockets into which particulate material in the gases naturally collects so as to inhibit flow of the gases therethrough. If dimples are formed on the several adjacent sheets there is a possibility that dimples thereof will correspond and the sheets will nest so as to close the passageways therebetween to the flow of fluid. Alternately, if the dimples of the adjacent sheets should meet in an "end to end" relationship there will be a double spacing between sheets and it becomes impossible to pack sufficient heat absorbent element into a given space to attain the design heat transfer capacity.

This invention therefore has for a principle objective the provision of an arrangement for dimpled heat exchange sheets whereby deposits will not collect thereon and the heat transfer coefficient of fluids flowing through the passageways between adjacent sheets will remain substantially constant.

Another objective of this invention is to maintain a continuously uniform space between plates so there will be a uniform loss of pressure throughout the surface of the heat exchanger.

The still further objective of this invention is to provide an effective dimpled element arrangement which may be readily produced and effectively arranged by a minimum amount of hand labor and thus substantially reduce the costs of manufacturing and assembly.

These results have been accomplished in the present invention by placing the dimples only on alternate element sheets so that the protuberances thereof produce a uniform spacing between sheets and maintain fluid passageways between sheets constantly sized whereby the resistance to gas flow therethrough and the heat absorbency of the sheets will be maintained substantially constant.

Additionally, the gas flow through the channels between element sheets is not restricted to certain longitudinal channels but is free to circulate completely around the dimples formed therein so that there are no "dead spots" that collect deposits and ultimately lower the effectiveness of the device. Moreover there are no sharp "bends" or "folds" to form pockets that collect deposits to resist cleaning and thus promote failure from corrosion.

Inasmuch as all "dimple" arranged type spacers are formed only on sheets that are alternately with completely plane sheets there is no possibility that the "dimples" of adjacent sheets will occasionally meet in an "end on" position to form a double spacing, or that they will mate to permit the plates to come together and close the passageway therebetween in the manner that is common with an assembly of "dimpled" sheets of the usutl construction.

To this end the invention contemplates forming dimple type spacers on opposite sides of an element sheet and then arranging such a sheet between substantially plane sheets of element whereby when repeated the dimpled element sheets alternate with plane sheets to form a bundle of heat transfer material which will not "nest" or form uneven passageways therethrough. Moreover since there is no necessity for matching or misaligning of element sheets to provide an optimum or even spacing therebetween, there will be a minimum of effort required to obtain an optimum arrangement and such sheets may be sheared, shaped compressed or otherwise treated without affecting the optimum arrangement desired.

The invention may be readily understood when viewed in conjunction with the accompanying drawings in which.

In accordance with this invention, the heat transfer element comprises essentially a series of substantially flat plates 12 held apart a predetermined distance $d$ by dimples 14 formed on opposite sides of the given element sheet 16. The dimples are formed with their centers laterally offset only slightly with substantially straight wall extending between their peaks and arranged to minimize "leverage" or "bending" thereof when the sheets are tightly packed together.

Figure 1:
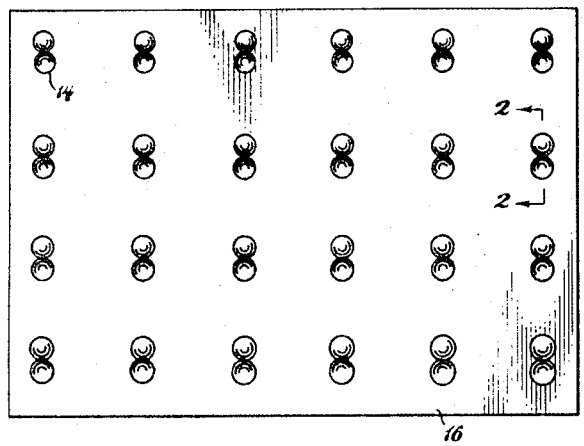
FIG. 1 is a plan view of the heat exchanger bundle made according to this invention.

FIG. 1 shows plan view of a typical sheet of heat transfer surface formed with an even arrangement of double surface dimples according to this invention. The double dimples can be formed into a sheet according to one of many different arrangements dependent upon the characteristics of the plate material and their projected use. Such materials may advantageously be metal, ceramic, plastic, or any combination thereof displaying the desired characteristics.

Figure 2:
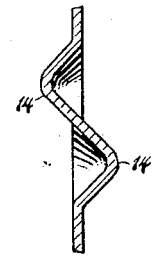
FIG. 2 is an enlarged side view of an element as seen from line 2—2 of FIG. 1.

FIG. 2 shows a cross section through a double dimple formed into a sheet in the manner of this invention. The double dimples may be formed by any one of the available methods such as rolling or die-forming, however it has been found that greater precision is obtained by die-forming. Thus it is possible to more carefully position the opposing dimples so that a side wall of one comprises an extension of a wall of an opposing dimple.

Figure 3:
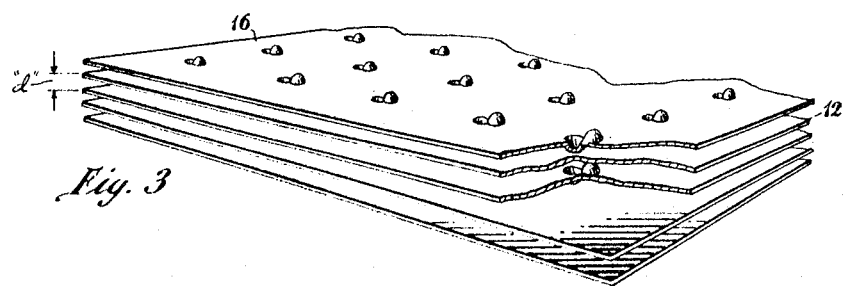
FIG. 3 is an element bundle of dimpled sheet.

FIG. 3 shows an isometric view of the double dimpled heat transfer sheet for use in a regenerative heat exchanger. The double dimpled sheets are assembled alternately with flat sheets so that the dimples serve primarily as spacers for the flat sheets providing passageways for the flow of gases therebetween. The sheets are assembled into a pack and compressed together to provide an integral unit of the customary type. The overall shape of the assembly is immaterial and any number of shapes may be packed together to produce rectangular, trapezoidal, circular, or oval shaped units in accordance with the overall design of the invention. The element then may be packed or assembled directly into a regenerative rotor structure or into baskets prior to installation in the rotors of the preheater.

Figure 4:
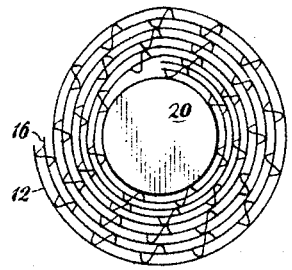
FIG. 4 is a sectional view showing continuous strips of element rolled on a rotor post.

FIG. 4 shows a method of assembling a double dimpled surface by continuously rolling a dimpled sheet 16 and plane sheet 12 alternately on a rotor post 20 or hub so that it forms a continuous regenerative rotor. As the surface is rolled on the rotor post, tension is placed on the coils to provide a continuously tight rotor.

Figure 5:
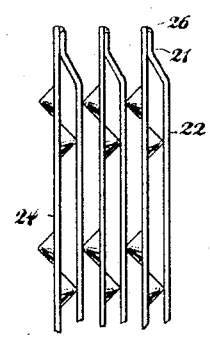
FIG. 5 shows an arrangement for joining adjacent sheets to be used in a recuperative heat exchanger.

FIG. 5 shows an arrangement for joining a double dimpled sheet and a flat sheet together to provide a core for a recuperative heat exchanger. In the manner shown two opposing edges 20 of a flat plate 22 are offset laterally a distance equal to the height of a dimple and joined to a conventional "double dimpled" sheet by a continuous weld 24 to form a closure along opposite sides of the unit. Pairs of sheets forming "envelopes" in this manner may be arranged in juxtaposition with their closed ends along opposite or adjacent sides thereof to provide counter-flow or cross-flow heat exchangers of the usual type as desired. A heat exchanger "core" of this type may be installed in a housing having conventional manifolding means (not shown) to properly connect it to the inlet and outlet ports of the several fluids.

If desired, the flange 20 may be formed on the dimpled sheet 24 and the sheet 22 left completely flat whereby no processing whatsoever is required for alternate sheets. Thus it is evident that various changes may be made in the specific design without departing from the spirit of the invention. It is therefore intended that all matter contained in the above description or shown in the accompanying drawings shall be interpreted as illustrative and not in a limiting sense.

I claim:

1. An assembly of heat absorbent element for a heat exchanger comprising a series of heat absorbent sheets in juxtaposed relation defining walls of passageways for the flow of fluid between open ends thereof, spacers between plane sheets providing said passageways with a predetermined distance between passage walls, said spacers comprising dimples formed on opposite sides of alternate sheets of heat absorbent element with a wall of a dimple extending outward from one face of said sheet comprising an unbroken extension of a wall of a dimple formed on the opposite side thereof.

2. An assembly of heat absorbent element as defined in claim 1 wherein a pair of opposite edges of said plane sheet are offset laterally an amount substantially equal to the height of said dimples.

3. An assembly of heat absorbent element as defined in claim 2 including means joining the offset edges of one sheet to an adjacent sheet to form an open ended envelope whose walls form a passageway spaced apart by the dimples therebetween.

References Cited

UNITED STATES PATENTS

| 1,826,344 | 10/1931 | Dalgliesh | 165—170 |
| 3,211,219 | 10/1965 | Rosenblad | 165—166 |

FOREIGN PATENTS

| 808,844 | 11/1936 | France |
| 1,053,252 | 9/1953 | France. |
| 901,951 | 7/1962 | Great Britain. |

FRED C. MATTERN, Jr., Primary Examiner

MANUEL ANTONAKAS, Assistant Examiner

U.S. Cl. X.R.

165—166